United States Patent Office 3,780,134
Patented Dec. 18, 1973

3,780,134
VINYL HALIDE RESIN COMPOSITIONS CONTAINING ABS AND MBS GRAFT POLYMERS
Thor J. G. Lonning, Suffield, Conn., assignor to Monsanto Company, St. Louis, Mo.
No Drawing. Filed May 30, 1972, Ser. No. 257,860
Int. Cl. C08f 41/12
U.S. Cl. 260—876 R    4 Claims

ABSTRACT OF THE DISCLOSURE

Polyblends of vinyl halide resin, graft copolymers having a styrene/acrylonitrile superstrate and a butadiene substrate, and graft copolymers having a styrene/methyl methacrylate superstrate and a butadiene substrate. Film and sheet material formed from such blends are characteristically semi-rigid and display unusually high flex endurance.

BACKGROUND

Characteristically, vinyl halide resins, when in the form of semi-rigid sheet and film materials, have relatively low flex endurance. For example, a homopolyvinylchloride based semi-rigid formulation containing 16 to 22 parts per 100 parts resin of a monomeric type plasticizer, filled or unfilled, and formed into a sheet about 15 to 30 mils thick typically displays poor flex fatigue characteristics (e.g. about 3 to 12,000 flex cycles measured on a Ross Flex Tester using ASTM test procedure No. D-1052. Vinyl halide resin polyblends having such limited flex endurance have heretofore not generally been suited for utilization in those applications where flex endurance is desirable, such as in shoe counters, plastic one-piece hinges, and the like.

There has now been discovered a new and very useful vinyl halide resin based composition which, when formed into sheet members ranging from, say, about 15 to 30 mils in thickness, displays unusually good flex fatigue characteristics, typically about 40,000 to 1,000,000 Ross Flex cycles, measured as above indicated, though larger and smaller numbers of Ross Flex cycles may be observed, depending upon the particular type and level of individual components used in any given such composition.

These unusual flex properties are gained without substantially adversely affecting various other physical strength properties, such as tensile strength, impact strength, high speed stitch crack resistance, and the like. Sometimes these associated physical properties are actually apparently improved in the compositions of this invention compared to prior act, such as the homopolyvinylchloride semi-rigid based formulation above referenced.

SUMMARY

The present invention relates to an improved vinyl halide resin based polyblend of the type containing on a 100 weight percent total polyblend composition basis—

(a) From about 1 to 10 weight percent of a stabilizer system for said polyblend, said stabilizer system being adapted to substantially prevent thermal degradation in said polyblend at temperatures in the range of from about 120 to 215° C. at inverse times of from about 30 minutes to 10 minutes, (b) Up to about 50 weight percent of a plasticizer system, the amount of plasticizer in any given polyblend being sufficient to produce in said polyblend after such is heat fused at a temperature in the range of from about 120 to 215° C., a stiffness in flexure E value in the range of from about 20,000 to 200,000 p.s.i., and (c) From about .2 to 2.5 weight percent of a lubricant system adapted to permit release of said polyblend from a heated solid surface after said polyblend has been heat fused at a temperature in the range of from about 120 to 215° C.

The improvement of the present invention concerns the utilization, in such type of polyblend, of a combination of three components, as follows (on a 100 weight percent three component composition basis):

(A) From about 20 to 76 weight percent of vinyl halide polymer selected from the group consisting of homopolyvinyl chloride and vinyl chloride copolymers comprising at least about 85 weight percent vinyl chloride monomer with the balance up to 100 weight percent of any given such copolymer being another ethylenically unsaturated monomer copolymerized with said vinyl chloride monomer, said vinyl halide polymer being itself characterized by having an inherent viscosity of from about 0.70 through 1.5 in a 0.2 weight percent cyclohexanone solution at about 25 to 30° C. (measured by ASTM procedure D–1243–66 Method A), (B) From about 20 to 55 weight percent of a first graft copolymer comprising:

(1) a substrate comprising on a 100 weight percent total substrate basis:
  (a) at least about 50 weight percent of a combined conjugated alkadiene containing from 4 through 6 carbon atoms per molecule,
  (b) not more than about 50 weight percent of a combined monovinyl aromatic compound containing from 8 through 10 carbon atoms per molecule, and
  (c) not more than about 25 weight percent of a combined alkene nitrile containing from 3 through 5 carbon atoms per molecule, (2) said substrate being further characterized by having
  (a) a glass phase transition temperature below about 0° C.,
  (b) a Young's modulus of less than about 40,000 p.s.i., and
  (c) a dispersed particle size distribution such that at least about 95 weight percent thereof is in the form of particles ranging from about .7 to 15 microns in diameter, (3) a superstrate comprising on a 100 weight percent total superstrate basis:
  (a) from about 15 to 50 weight percent of a combined alkene nitrile containing from 3 through 5 carbon atoms per molecule, and
  (b) from about 50 to 85 weight percent of a combined monovinyl aromatic compound containing from 8 through 10 carbon atoms per molecule, (4) said superstrate being grafted to said substrate to the extent of about 70 to 150 parts by weight graft per 100 parts by weight of substrate, and (C) From about 4 to 25 weight percent of a second graft copolymer comprising:

(1) a substrate comprising on a 100 weight total substrate basis:
  (a) at least about 65 weight percent of a combined conjugated alkadiene containing from 4 through 6 carbon atoms per molecule, and
  (b) not more than about 35 weight percent of a combined monovinyl aromatic compound containing from 8 through 10 carbon atoms per molecule, (2) said substrate being further characterized by having
  (a) a glass phase transition temperature below about 0° C.
  (b) a Young's modulus of less than about 40,000 p.s.i. and
  (c) a dispersed particle size distribution such that at least about 90 weight percent thereof is in the form of particles ranging in size from about .07 to .3 micron in diameter, (3) a superstrate comprising on a 100 weight percent total superstrate basis:
   (a) from about 40 to 99 weight percent of a combined lower alkyl acrylate containing from 5 through 8 carbon atoms per molecule, and
   (b) from about 1 to 60 weight percent of a combined monovinyl aromatic compound containing from about 8 through 10 carbon atoms per molecule,
(4) said superstrate being grafted to said substrate to the extent of about 50 to 150 parts by weight graft per 100 parts by weight of substrate.

VINYL HALIDE POLYMER

Vinyl halide polymers employed as starting materials in this invention (as broadly described above) are well known to the art, and generally any such polymer having properties as above indicated can be used in this invention.

Preferred vinyl chloride copolymers are produced by copolymerizing vinyl chloride monomer with other ethylenically unsaturated aliphatic monomers having molecular weights generally under about 260 and copolymerizable with vinyl chloride to produce polyvinyl chloride include olefins, such as ethylene, propylene, and the like; vinylidene monomers such as vinyl esters of monobasic organic acids containing 1–20 carbon atoms (e.g., vinyl ether, 2-ethyl hexyl vinyl ether, benzyl vinyl ether, etc.) and vinylidene chloride; alkyl acrylate esters in which the alkyl group contains 1–20 carbon atoms (e.g., methyl acrylate, butyl acrylate, octadecyl acrylate, etc.); the corresponding alkyl methacrylate esters, dialkyl esters of dibasic organic acids in which the alkyl groups contain 2–8 carbon atoms (e.g., dibutyl fumarate, diethyl maleate, etc.); and the like.

It is preferred to use vinyl halide polymers as starting materials which are in the form of particles at least 90 weight percent of which pass through a 40 mesh USBS sieve.

STABILIZERS

Those skilled in the art will readily appreciate that polyblends of this invention can employ any conventional stabilizer system having properties as above indicated. Many different stabilizers and stabilizer combinations are known; see for example, listing and descriptions given in the 1967 issue of Modern Plastics Encyclopedia, pages 412–415, 491–493 and 509. One presently preferred stabilizer system consists of a combination Tri-basic-lead-sulphate (e.g. Tribase XL (N.L. Industries)) and 4.4'-Butylidene-bis-(6 - t-Butyl-m-cresol) (e.g. Santowhite Powder (Monsanto Co.)).

LUBRICANTS

Those skilled in the art will readily appreciate that polyblends of this invention can employ any conventional lubricant system having properties as above indicated. Many different lubricants and lubricant combinations are known, such as fatty acids, fatty acid salts and esters, paraffinic waxes, and the like. One presently preferred lubricant is a Di-basic lead stearate e.g. D.S. 207 (N.L. Industries)).

PLASTICIZERS

Those skilled in the art will readily appreciate that polyblends of this invention can employ any conventional plasticizer system having properties as above indicated. Many different plasticizers and plasticizer combinations are known; see, for example, listing and descriptions given in the 1967 issue of Modern Plastics Encyclopedia, pages 418–450. One presently preferred plasticizer is Heptyl Nonyl Adipate (Santicizer 97A (Monsanto Co.)).

ADDITIVES

Optionally, if desired, one may incorporate into polyblends of this invention, in addition to the above components, minor amounts, usually less than about 15 weight percent (total composition basis) of conventional additives, such as colorants, fillers, processing aids, flame retardants, and the like.

PROCESSING

The vinyl halide polymer and various additives can be preblended before being admixed together into a composition of the invention, or not, as desired. Preblending can be accomplished by simple, conventional physical mixing using, for example, a ribbon blender, or the like.

The blends of this invention can conveniently be made either by intensive mechanical mixing without fusion in powder form, or by mechanical mixing with heat-fusion followed by dicing (or other equivalent procedure of particulation).

When using the latter technique, it is convenient and preferred to prepare a preblend mixture of starting materials by mechanically mixing same, and then to subject such preblend for a short period of time to further mixing at a temperature above the fusion (melting) temperature of the resinous (polymeric) components (starting materials) to homogenize same. This homogenizing procedure may be performed on a 2-roll rubber mill until the polymer fuses and a rolling bank is formed. The roll temperatures are maintained at about 160–180° C. throughout the mixing operation. Alternatively, such a preblend may be homogenized and fused in a Banbury Mixer.

When preparing a non-fused powder blend, vinyl chloride polymer and plasticizer composition plus optional additives) are conveniently mechanically blended in an intensive mixer, such as a Henschel Mixer, or the like.

In general, a compression molded slab of blends of this invention should, when subsequently statically exposed in air-oven, demonstrate a substantial freedom from discoloration after 10 minutes at 190° C. at atmospheric pressure.

To form blends into sheets or films are heat-fused by calendering such blends. Heat fusion may be conventionally accomplished preferably using temperatures ranging from about 170–215° C. The apparatus used, for example, may be:

(a) a Banbury mixer
(b) a two-roll mill
(c) an extruder, especially a screw type
(d) a calender roll series or the like, as those skilled in the art will appreciate.

Sheets and films are conveniently made from blends of the invention by calendering same at temperatures generally ranging from about 170° C. to 215° C. depending upon quantity of plasticizer employed in a given blend.

The dispersed particle size distribution of the substrate in the case of the first graft copolymer is conveniently measured for purposes of the present invention by the use of either angular dependent light scattering or centrifugal photosedimentometry.

The dispersed particle size distribution of the substrate in the case of the second graft copolymer is conveniently measured for purposes of the present invention by the use of transmission photomicrographs of a stained, microtomed section of a compression molded sample of such graft copolymer material.

One preferred class of products of the present invention are polyblends of vinyl halide polymer, first graft copolymer and second graft copolymer, all as herein above described, which has been heat fused and formed into sheet members ranging in thickness from about 10 to 125 mils, with thickness ranges of from about 12 to 50 mils being more preferred.

FIRST GRAFT COPOLYMER

The first graft copolymer has substrate as defined above. A preferred class of substrates here for use in this invention are diene polymer elastomers. Examples of diene polymer elastomers include, for example, natural rubber having isoprene linkages, polyisoprene, polybutadiene (preferably one produced using a lithium alkyl or Ziegler catalyst), styrene-butadiene copolymer elastomers, butadiene acrylonitrile copolymer elastomer, mixtures thereof, and the like. Such elastomers include homopolymers and interpolymers of conjugated 1,3-dienes with up to an equal amount by weight of one or more copolymerizable monoethylenically unsaturated monomers, such as monovinyl aromatic compounds; acrylonitrile, methacrylonitrile; and the like.

A more preferred group of diene polymer elastomers are those consisting essentially of about 75.0 to 100.0 percent by weight of butadiene and/or isoprene and up to about 25.0 percent by weight of a monomer selected from the group consisting of monovinyl aromatic compounds and alnitrile (e.g. acrylonitrile), or mixtures thereof. Particularly advantageous elastomer substrates are butadiene homopolymer or an interpolymer of 90.0 to 95.0 percent by weight butadiene and 5.0 to 10.0 percent by weight of acrylonitrile or styrene.

Although the substrate of a first or a second graft copolymer employed in this present invention may generally contain up to about 2.0 percent by weight of a crosslinking agent, based on the weight of the rubber-forming monomer or monomers, crosslinking may present problems in dissolving the rubber in monomers for a graft polymerization reaction (as when one makes an interpolymer system as described in more detail hereinafter). In addition, excessive crosslinking can result in loss of the rubbery characteristics. The crosslinking agent can be any of the agents conventionally employed for crosslinking rubbers, e.g. divinyl benzene, diallyl maleate, diallyl fumarate, diallyl adipate, allyl acrylate, allyl methacrylate, diacrylates and dimethacrylates of polyhydric alcohols, e.g. ethylene glycol dimethacrylate, etc.

Preferred substrates for the first graft copolymer have a dispersed particle size distribution such that at least about 95 weight percent thereof is in the form of particles ranging from about 1 to 3 microns in diameter.

The first graft copolymer has a superstrate as defined above. A preferred class of superstrates comprises those formed of styrene and acrylonitrile. Preferably the superstrate contains from about 55–75 weight percent of the monovinyl aromatic compound with the balance up to 100 weight percent thereof being the alkene nitrile compound.

Preferably, a first graft copolymer has from about 90–120 parts by weight graft per 100 parts by weight substrate.

SECOND GRAFT COPOLYMER

The second graft copolymer has a substrate as defined above. A preferred class of substrates for second graft copolymers are diene rubber polymer elastomers, especially those consisting essentially of about 75.0 to 100 weight percent butadiene or isoprene and up to about 25.0 weight percent of a monovinyl aromatic compound such as, for example, styrene. Particularly advantageous elastomer substrates are of a butadiene homopolymer.

Preferred substrates for the second graft have a dispersed particle size distribution such that at least about 90 weight percent thereof is in the form of particles ranging in size from about .09 to .3 micron in diameter.

The second graft copolymer has a superstrate as defined above. A preferred class of superstrates comprises those formed of styrene and methyl methacrylate. Preferably, a superstrate contains from about 70 to 95 weight percent of the lower alkyl acrylate with the balance up to 100 weight percent thereof being the monovinyl aromatic compound.

Preferably, the second graft copolymer has from about 70 to 100 parts by weight graft per 100 parts by weight substrate.

An especially preferred class of second graft copolymers contains from about 30 to 35 weight percent combined butadiene, from about 45 to 50 weight percent combined methyl methacrylate, and from about 20 to 25 weight percent combined styrene, all based on 100 weight percent total second graft copolymer weight. In addition, such especially preferred class in its superstrate contains from about 80 to 85 weight percent combined methyl methacrylate with the balance up to 100 weight percent thereof being styrene. Further, in such especially preferred class, the graft ratio of superstrate to substrate is such that there is from about 70 to 100 weight percent graft per 100 parts by weight of substrate. Characteristically, such especially preferred class has a gel content (indicative of total substrate polymer present in the graft copolymer) of from about 55 to 65 weight percent, and a total superstrate content of from about 35 to 45 weight percent, of which about 20 to 30 weight percent is grafted to the substrate. Here, the substrate comprises about 8 to 18 weight percent styrene combined wtih butadiene up to 100 weight percent.

The first and the second graft copolymers are old to the art, and may be prepared by any conventional means known to those skilled in the art. For example, the first graft copolymer is sometimes known as an ABS-type graft copolymer and may be prepared by suspension polymerization techniques, while the second graft copolymer is sometimes known as an MBS-type graft copolymer and may be prepared by emulsion polymerization techniques.

Those skilled in the art will appreciate that a first or a second graft copolymer typically contains (as indicated above in the recitation of superstrate to substrate graft ratios) some ungrafted superstrate material, and that sometimes ungrafted substrate material is also present in a first or a second graft copolymer. While it is preferred for purposes of practicing the present invention to use a first and a second graft copolymer as such when compounding a blend of this invention, it will be appreciated that one can add ungrafted substrate or superstrate material to a blend of this invention. Typically, added elastomer (substrate) has a plasticizing effect, while typically added superstrate tends to have an embrittling effect (particularly over minimum added amounts). It is preferred to keep amounts of added superstrate and/or substrate materials below about 15 weight percent (based on total product polyblend weight).

In a heat fused polyblend of this invention, such as one which has been formed with a film or sheet member, it is presently theorized (and there is no intent to be bound by a theory in this invention) that ungrafted superstrate material, and even ungrafted substrate material, may, and in some instances, actually does, blend with and fully alloy or mix with the polyvinyl halide polymer, so that, in such a heat fused system, there is a continuous phase of predominantely polyvinyl halide polymer within which is dispersed discontinuities (or discontinuous phases) of the first graft copolymer and of the second graft copolymer.

EMBODIMENTS

The following additional examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Examples A–F

The following vinylchloride polymers as shown in Table I are used in the preparation of polyblends of this invention.

Examples G–I

The following first graft copolymers as shown in Table II are used in the preparation of polyblends of this invention. Substrates of these graft copolymers each have glass phase transition temperatures below about 0° C.; a Young's moduli of less than about 40,000 p.s.i. If desired the substrate may contain styrene and/or acrylonitrile.

TABLE I.—VINYL CHLORIDE POLYMERS

| Polymer | | Specific viscosity [1] | Inherent viscosity [2] | ASTM classification [3] | Inherent viscosity [7] | Polymerization degree |
|---|---|---|---|---|---|---|
| Example designation: | | | | | | |
| A | Homopolyvinyl chloride [4] | 0.39 | 0.82 | C-P-3-16363 | | |
| B | do.[5] | 0.48 | 0.98 | C-P-5-15453 | | |
| C | do.[6] | 0.55 | 11.1 | C-P-6-15453 | | |
| D | Copolymer of 97 wt. percent vinyl chloride and 3 wt. percent vinyl acetate.[8] | | | | 1.07 | |
| E | Copolymer of 90 wt. percent vinyl chloride and 3 wt. percent vinyl acetate.[9] | | | | 0.80 | |
| F | Homopolyvinyl chloride [10] | 0.69/0.70 | 1.34-1.37 | | | 2,300 |

[1] Specific viscosity measured using a solution of 0.42 gm. polymer in 100 ml. cyclohexanone at 25° C.
[2] Inherent viscosity measured using a solution of 0.2 wt. percent polymer in cyclohenanone at 30° C.
[3] ASTM classification according to ASTM test procedure D-1755-60T.
[4] Polymer available commercially from Monsanto Company, St. Louis, Mo., under that company's trademark "Opalon 630".
[5] Polymer available commercially from Monsanto Company, St. Louis, Mo., under that company's trademark "Opalon 650".
[6] Polymer available commercially from Monsanto Company, St. Louis, Mo., under that company's trademark "Opalon 660".
[7] Inherent viscosity measured using a solution of 0.2 wt. percent polymer in cyclohexanone at 25° C.
[8] Polymer available commercially from Union Carbide Plastics Co. under the trade designation VYNW.
[9] Polymer available commercially from Union Carbide Plastics Co. under the trade designation VYNS.
[10] Polymer available commercially from Monsanto Mitsubishi Kasei under the trade designation resin KR-S00.

TABLE II.—FIRST GRAFT POLYMER

| | Substrate | Superstrate | Average particle size [1] (microns) | Parts superstrate per 100 parts substrate |
|---|---|---|---|---|
| Example designation: | | | | |
| F [2] | Homopolybutadiene | 71-73 wt. percent styrene and 27-29 wt. percent acrylonitrile. | 1.5-1.8 | 95-115 |
| G [2] | do | do | 1.1-1.2 | 90-100 |
| H [2] | do | do | 0.9-1.0 | 90-100 |

[1] Dispersed particle size distribution for at least about 95 weight percent of specified graft copolymer substrates.
[2] Graft copolymers produced by suspension polymerization.

EXAMPLE J

A second graft copolymer has a substrate of 8–18 weight percent styrene with the balance up to 100 weight percent thereof being butadiene. This substrate has a glass phase transition temperature below about 0° C., a Young's modulus of less than about 40,000 p.s.i. and a dispersed particle size distribution such that at least about 95 weight percent thereof is in the form of particles ranging from about 0.1 to 0.3 micron. In addition, this graft copolymer has a superstrate of about 80–85 weight percent combined methyl methacrylate with the balance up to 100 weight percent thereof being styrene. The graft ratio of superstrate to substrate is such that there is from about 70 to 100 weight percent graft per 100 parts by weight of substrate. There is a gel content of about 55 to 65 weight percent, and a total superstrate content of from about 37 to 40 weight percent, of which 25 to 30 weight percent is grafted to the substrate. Here, the substrate comprises about 8 to 15 weight percent styrene combined with the balance up to about 100 weight percent of butadiene.

This second graft copolymer contains from about 32.4 weight percent combined butadiene, from about 44 to 47 weight percent combined methyl methacrylate, and from about 20 to 23 weight percent combined styrene, all based on 100 weight percent total second graft copolymer weight. This material is available commercially under the trade designation "Acryloid 229" from the Rohm and Haas Company, Philadelphia, Pa. "Acryloid" is a trademark of the company.

EXAMPLES K–N

The following stabilizer systems as shown in Table III are used in the preparation of polyblends of this invention.

EXAMPLES O–Q

The following plasticizers as shown in Table V are used in the preparation of polyblends of this invention.

EXAMPLES R AND S

The following lubricants as shown in Table VI are used in the preparation of polyblends of this invention.

TABLE III.—STABILIZER SYSTEMS

| | Composition | Type | Physical form |
|---|---|---|---|
| Example designation: | | | |
| K | Tribasic lead sulfate [1] | Heat stabilizer | Solid. |
| L | Barium/cadmium fatty acid salt.[2] | do | Do. |
| M | Alkyl aryl phosphate [3] | Chelator | Liquid. |
| N | 4,4'-butylidene-bis (6-t-butyl-m-cresol).[4] | Antioxidant | Solid. |

[1] Available commercially as "Tribase XL" (TM) from NL Industries.
[2] Available commercially as "Mark 1260" (TM) from Argus Chem Corp., subsidiary of Wittco Chemical Co.
[3] Available commercially as "Mark C" (TM) from Argus Chem Corp., subsidiary of Wittco Chemical Co.
[4] Available commercially as "Santowhite Powder" (TM) from Monsanto Co.

TABLE IV.—PLASTICIZERS

| | Composition | Physical form |
|---|---|---|
| Example designation: | | |
| O | Heptyl nonyl adipate [1] | Liquid. |
| P | Heptyl nonyl tri mellitate [2] | Do. |
| Q | Di (isodecyl)phthalate [3] | Do. |

[1] Available commercially as "Santicizer 97A" (TM).
[2] Available commercially as "Santicizer 79TM" (TM).
[3] Available commercially as DIDP from Monsanto Company.

TABLE V.—LUBRICANTS

| | Composition | Physical form |
|---|---|---|
| Example designation: | | |
| R | Dibasic lead stearate [1] | Solid. |
| S | Stearic acid [2] | Do. |

[1] Available commercially as "DS-207" from N.L. Industries.
[2] Available commercially from Witco Chemical Co.

Examples 1–23

The above component of each of Examples A through S, respectively, is utilized in the preparation of a series of polyblends of this invention. Each polyblend is then formed into a sheet member and tested for stiffness and flex fatigue.

The procedure involves mixing together the respective components of each polyblend together in blending operation until substantial uniformity of intermixing occurs. Then each blend is Banburied, mill rolled, and calendered at 170 to 180° C. to make a sheet of from 15 to 30 mils thick.

The sheets prepared from each polyblend are tested for (A) Tinius Olsen stiffness using ASTM-D-747-61T (measured in stiffness of flexure, E, in pounds per square inch, and (B) Ross Fatigue Flexing using ASTM-test D-1052 (in total number of cycles to break).

What is claimed is:

1. In an improved vinyl halide resin based polyblend of the type containing on a 100 weight percent total polyblend composition basis—
   (a) from about 1 to 10 weight percent of a stabilizer system for said polyblend, said stabilizer system being adapted to substantially prevent thermal degradation in said polyblend at temperatures in the range of from about 120 to 215° F. at inverse times of from about 30 minutes to 10 minutes,
   (b) up to about 50 weight percent of a plasticizer system, the amount of plasticizer in any given polyblend being sufficient to produce in said polyblend after such is heat fused at a temperature in the range of from about 120 to 215° F., a stiffness in flexure E value in the range of from about 20,000 to 200,000 p.s.i., and
   (c) from about .2 to 2.5 weight percent of a lubricant system adapted to permit release of said polyblend from a heated solid surface after said polyblend has been heat fused at a temperature in the range of from about 120 to 215° F., the improvement which comprises, in combination on a 100 weight percent basis:
   (A) from about 20 to 76 weight percent of vinyl halide polymer selected from the group consisting of homopolyvinyl chloride and vinyl chloride copolymers comprising at least about 85 weight percent vinyl chloride monomer with the balance up to 100 weight percent of any given such copolymer being another ethylenically unsaturated monomer copolymerized with said vinyl chloride monomer, said vinyl halide polymer being itself characterized by having an inherent viscosity of from about 0.70 through 1.5 in a 0.2 weight percent cyclohexanone solution at about 25 to 30° C.;
   (B) From about 20 to 55 weight percent of a first graft copolymer comprising:
     (1) a substrate comprising on a 100 weight percent total substrate basis:
       (a) at least about 50 weight percent of a combined conjugated alkadiene containing from 4 through 6 carbon atoms per molecule,
       (b) not more than about 50 weight percent of a combined monovinyl aromatic compound containing from 8 through 10 carbon atoms per molecule, and
       (c) not more than about 25 weight percent of a combined alkene nitrile containing from 3 through 5 carbon atoms per molecule,
     (2) said substrate being further characterized by having:
       (a) a glass phase transition temperature below about 0° C.,
       (b) a Young's modulus of less than about 40,000 p.s.i., and
       (c) a dispersed particle size distribution such that at least about 95 weight percent thereof is in the form of particles ranging from about 0.7 to 15 microns in diameter, (3) a superstrate comprising on a 100 weight percent total superstrate basis:
(a) from about 15 to 50 weight percent of a combined alkene nitrile containing from 3 through 5 carbon atoms per molecule, and
(b) from about 50 to 85 weight percent of a combined monovinyl aromatic compound containing from 8 through 10 carbon atoms per molecule,
(4) said superstrate being grafted to said substrate to the extent of about 70 to 150 parts by weight graft per 100 parts by weight of substrate, and
(C) from about 4 to 25 weight percent of a second graft copolymer comprising:
(1) a substrate comprising on a 100 weight total substrate basis:
(a) at least about 65 weight percent of a combined conjugated alkadiene containing from 4 through 6 carbon atoms per molecule, and
(b) not more than about 35 weight percent of a combined monovinyl aromatic compound containing from 8 through 10 carbon atoms per molecule,
(2) said substrate being further characterized by having:
(a) a glass phase transition temperature below about 0° C.
(b) a Young's modulus of less than about 40,000 p.s.i., and
(c) a dispersed particle size distribution such that at least about 90 weight percent thereof is in the form of particles ranging in size from about .07 to 0.5 microns in diameter,
(3) a superstrate comprising on a 100 weight percent total superstrate basis:
(a) from about 40 to 99 weight percent of a combined lower alkyl acrylate containing from 5 through 8 carbon atoms per molecule, and
(b) from about 1 to 60 weight percent of a combined monovinyl aromatic compound containing from about 8 through 10 carbon atoms per molecule,
(4) said superstrate being grafted to said substrate to the extent of about 50 to 150 parts by weight graft per 100 parts by weight of substrate.

2. An improved vinyl halide resin based polyblend of claim 1 comprising:
(A) from about 20 to 76 weight percent homopolyvinyl chloride, said homopolyvinyl chloride polymer being itself characterized by having an inherent viscosity of from about 0.70 through 1.5 in a 0.2 weight percent cyclohexanone solution at about 25 to 30° C.
(B) from about 20 to 55 weight percent of a first graft copolymer comprising:
(1) a substrate comprised of homopolybutadiene,
(2) said substrate being further characterized by having:
(a) a glass phase transition temeprature below about 0° C.,
(b) a Young's modulus of less than about 40,000 p.s.i., and
(c) a dispersed particle size distribution such that at least about 95 weight percent thereof is in the form of particles ranging from about 1 to 3 microns in diameter,
(3) a superstrate comprising on a 100 weight percent total superstrate basis:
(a) from about 25 to 45 weight percent of combined acrylonitrile, and
(b) from about 55 to 75 weight percent of combined styrene,
(4) said superstrate being grafted to said substrate to the extent of about 90 to 120 parts by weight graft per 100 parts by weight of substrate, and
(C) from about 4 to 25 weight percent of a second graft copolymer comprising:
(1) a substrate comprised of from about 8 to 18 weight percent styrene with the balance up to 100 weight percent thereof being butadiene,
(2) said substrate being further characterized by having:
(a) a glass phase transition temperature below about 0° C.
(b) a Young's modulus of less than about 40,000 p.s.i., and
(c) a dispersed particle size distribution such that at least about 90 weight percent thereof is in the form of particles ranging in size from about 0.1 to 0.3 micron in diameter,
(3) a superstrate comprising on a 100 weight percent total superstrate basis:
(a) from about 70 to 95 weight percent of combined methylmethacrylate, and
(b) from about 5 to 30 weight percent of combined styrene,
(4) said superstrate being grafted to said substrate to the extent of about 70 to 100 parts by weight graft per 100 parts by weight of substrate.

3. A heat fused polyblend of claim 1 formed into a sheet member of from about 10 to 125 mils in thickness.

4. A heat fused polyblend of claim 2 formed into a sheet member of from about 12 to 50 mils in thickness.

References Cited

UNITED STATES PATENTS

| 3,689,598 | 9/1972 | Bierwirth et al. | 260—876 |
| 3,657,390 | 4/1972 | Tanaka et al. | 260—876 |
| 3,657,391 | 4/1972 | Curfman | 260—876 |
| 2,857,360 | 10/1958 | Feuer | 260—876 |
| 2,802,809 | 8/1957 | Hayes | 260—876 |

MURRAY TILLMAN, Primary Examiner

C. J. SECCURO, Assistant Examiner

U.S. Cl. X.R.

260—23.7 N, 28.5 B, 31.8 M, 45.75 R, 49.95

UNITED STATES PATENT OFFICE
CERTIFICATE OF CORRECTION

Patent No. 3,780,134         Dated December 18, 1973

Inventor(s) Thor J. G. Lonning

It is certified that error appears in the above-identified patent and that said Letters Patent are hereby corrected as shown below:

Column 9, Table VI, last line in Example column, delete --- 53 ---.

Signed and sealed this 30th day of July 1974.

(SEAL)
Attest:

McCOY M. GIBSON, JR.             C. MARSHALL DANN
Attesting Officer                Commissioner of Patents

PO-1050
(5/69)

UNITED STATES PATENT OFFICE
CERTIFICATE OF CORRECTION

Patent No. 3,780,134     Dated December 18, 1973

Inventor(s) Thor J. G. Lonning

It is certified that error appears in the above-identified patent and that said Letters Patent are hereby corrected as shown below:

In the Claims —

Column 10, line 23, reads "120 to 215°F." and should read — — — 120 to 215°C.

Column 10, line 29, reads "120 to 215°F." and should read — — — 120 to 215°C.

Column 10, line 36, reads "120 to 215°F." and should read — — — 120 to 215°C.

Signed and sealed this 22nd day of October 1974.

(SEAL)
Attest:

McCOY M. GIBSON JR.
Attesting Officer

C. MARSHALL DANN
Commissioner of Patents